(12) United States Patent
Brichford

(10) Patent No.: US 9,563,485 B2
(45) Date of Patent: Feb. 7, 2017

(54) BUSINESS TRANSACTION CONTEXT FOR CALL GRAPH

(71) Applicant: AppDynamics, Inc., San Francisco, CA (US)

(72) Inventor: Christopher Brichford, San Mateo, CA (US)

(73) Assignee: AppDynamics, Inc., San Francisco, CA (US)

( * ) Notice: Subject to any disclaimer, the term of this patent is extended or adjusted under 35 U.S.C. 154(b) by 53 days.

(21) Appl. No.: 14/530,560

(22) Filed: Oct. 31, 2014

(65) Prior Publication Data

US 2016/0127217 A1    May 5, 2016

(51) Int. Cl.
*G06F 13/00* (2006.01)
*G06F 9/54* (2006.01)
*G06F 11/30* (2006.01)

(52) U.S. Cl.
CPC .......... *G06F 9/54* (2013.01); *G06F 11/30* (2013.01)

(58) Field of Classification Search
CPC .................................. G06F 9/465; G06F 9/547
USPC ................................................. 719/316, 330
See application file for complete search history.

(56) References Cited

U.S. PATENT DOCUMENTS

| | | | | |
|---|---|---|---|---|
| 5,948,113 | A * | 9/1999 | Johnson | ............. G06F 11/0718 714/38.13 |
| 2015/0227362 | A1 * | 8/2015 | Dvinsky | ................. G06F 8/70 717/120 |

\* cited by examiner

*Primary Examiner* — Andy Ho
(74) *Attorney, Agent, or Firm* — Bachmann Law Group

(57) ABSTRACT

An application which utilizes a single thread is monitored and context for the individual requests and business transactions operating on that platform are provided. A wrapper is placed is around an object that calls a request. The wrapper renames a request object. Request objects are renamed with a unique name when they are called. When a call stack is sampled, the sampler will retrieve the unique name. Performance data associated with the unique name may be correlated to a business transaction and particular request as metrics are subsequently analyzed. For subsequent reporting, such as call graph reporting, the report or call graph will have requests in the context of a particular business transaction and a particular request instance. This provides more context in reporting of an business application request for frameworks that utilize as single request for multiple threads.

30 Claims, 6 Drawing Sheets

BUSINESS TRANSACTION CONTEXT FOR CALL GRAPH

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Application monitoring based on threads is relatively straightforward when one request is carried out by a single thread. Some web-based applications are based on frameworks that run on only one thread at a time—one thread processes many requests. These frameworks are more difficult to monitor and provide context for individual requests and transactions. Additionally, if the framework allows requests to operate asynchronously, a single threaded framework may not provide useful information when it is monitored. A single request called over and over may not be differentiated from other instances of the same request executed within the thread.

In such a system the application logic is decomposed into one or more functions. One or more of these function is registered with the framework such that when a request is received by the framework the framework will call one or more of the registered functions. An application using the framework may utilize services (such as other networked services, databases, caches etc) on the same computer or other computers. When an application utilizes one of these services the application may provide one or more of its functions to an API (application programming interface) for the service. When the framework detects completion, progress, or failure of the operation utilizing the service the framework will call one or more of the functions supplied to the API.

It would be useful to be able to monitor a framework that runs on only one thread and provide context for the requests within that thread.

SUMMARY

The present technology monitors an application which utilizes a single thread and is able to provide context for the individual requests and business transactions operating on that framework.

A wrapper function is a function object that references another function, the wrapped function, and when called: 1) does zero or more operations, 2) Calls the wrapped function, 3) Does zero or more operations. A function is said to be wrapped when one or more references to that function have been replaced by a wrapper function that references the original function. Each wrapper function may be given unique set of attributes. These attributes can include but are not limited to name, file name, and line number. When a call graph is created by a the framework certain nodes in the callgraph may be correlated with specific wrapper functions because the attributes of the wrapper function are in the call graph.

A wrapper is placed around a function that is called when a request is received. The wrapper is specific to the particular incoming request to the framework. The mapping between the attributes of the wrapper and the specific incoming request may be remembered (stored in memory, disk, etc.). Performance data associated with the unique name may be correlated to a business transaction and particular request as metrics are subsequently analyzed. For subsequent reporting, such as call graph reporting, the report or call graph will have requests in the context of a particular business transaction and a particular request instance. This provides more context in reporting of a business application request for frameworks that utilize as single request for multiple threads, such as the NodeJS built on Chrome's JavaScript runtime.

An embodiment may include a method for monitoring an application may modify an object with a callback wrapper by agent stored in memory. Sampled call stack data may be received by the agent. The sampled call stack data may include a unique identification for each request in a business transaction. The sampled call stack data may be reported to a remote server. The remote server reporting data associated with each request instance of a business transaction based on the sampled call stack data.

An embodiment may include a system for monitoring a business transaction. The system may include a processor, a memory and one or more modules stored in memory and executable by the processor. When executed, the one or more modules may modify an object with a callback wrapper by agent stored in memory, receive sampled call stack data by the agent, the sampled call stack data including a unique identification for each request in a business transaction, and report the sampled call stack data to a remote server, the remote server reporting data associated with each request instance of a business transaction based on the sampled call stack data.

DETAILED DESCRIPTION

The present technology monitors an application which utilizes a single thread and is able to provide context for the individual requests and business transactions operating on that framework.

A wrapper function is a function object that references another function, the wrapped function, and when called: 1) does zero or more operations, 2) Calls the wrapped function, 3) Does zero or more operations. A function is said to be wrapped when one or more references to that function have been replaced by a wrapper function that references the original function. Each wrapper function may be given unique set of attributes. These attributes can include but are not limited to name, file name, and line number. When a call graph is created by a the framework certain nodes in the callgraph may be correlated with specific wrapper functions because the attributes of the wrapper function are in the call graph.

A wrapper is placed around a function that is called when a request is received. The wrapper is specific to the particular incoming request to the framework. The mapping between the attributes of the wrapper and the specific incoming request may be remembered (stored in memory, disk, etc.). Performance data associated with the unique name may be correlated to a business transaction and particular request as metrics are subsequently analyzed. For subsequent reporting, such as call graph reporting, the report or call graph will have requests in the context of a particular business transaction and a particular request instance. This provides more context in reporting of a business application request for frameworks that utilize as single request for multiple threads, such as the NodeJS built on Chrome's JavaScript runtime.

Figure 1:
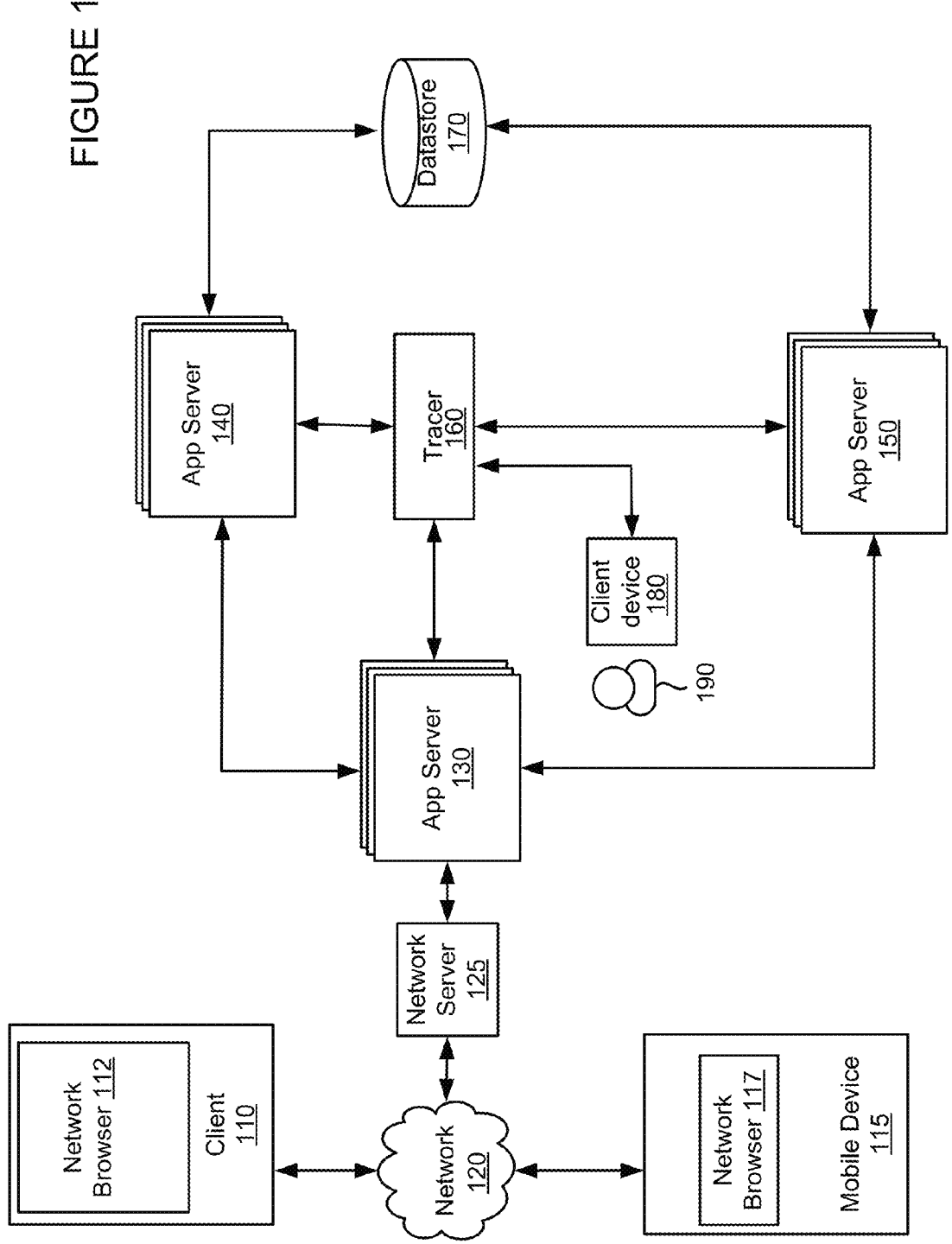
FIG. 1 is a block diagram for monitoring a framework executing one thread at a time.

One platform on which business services are provided over a network is node.js. Node.js is a software platform for scalable server side and networking applications. Node.js applications are written in Java script, and can be run with the node.js runtime on Windows, a Macintosh operating system, and Linux with no changes. Node.js applications maximize throughput and efficiency using non-blocking input output interfaces and asynchronous events and run on single threaded processes. Unlike Java, node.js may process workflows using a single thread. Therefore, node.js applications cannot be monitored at the level of typical Java applications, which a processor may associate with different threads. The present technology provides more context in reporting of an business application request on platforms that utilize as single request for multiple threads, such as the NodeJS FIG. 1 illustrates a block diagram of a system for monitoring a node.js application. The system of FIG. 1 may include client 110, mobile device 115, network 120, network server 125, application servers 130, 140 and 150, tracer 160, database 170, and client device 180.

Client 110 may include any device through which a user may initiate a request over network 120 to servers 130-140. Client device 110 may include network browser 110 and be implemented as a computing device, such as for example a laptop, desktop, workstation, or some other computing device. Network browser 112 may be a client application for sending requests and queries to an application server such as application server 130, as well as viewing content provided by an application server. Client device 110 may include hardware and/or software configured to access a web service provided by network server 125.

Mobile device 115 may be implemented as a portable device, such as for example a mobile phone, smart phone, tablet computer or other portable device. Mobile device 115 may include network browser 117, which may include a client application for viewing content provided by an application server, such as application server 130 via network server 125 over network 120

Network 120 may be used to receive and process communications, including requests and responses, between client 110, mobile device 115 and network server 125. In some embodiments, network 120 may also exist between other machines of FIG. 1, such as for example between application servers 130, 140 and 150, between application servers and data store 170, as well as other machines. Network 120 may include any public or private network for communicating data, such as for example a local area network, a wide area network, the internet, an intranet, a wireless network, a cellular network, or a combination of these networks.

Network server 125 may receive and process requests received from client 110 and mobile device 115 over network 120. Network server 125 may be implemented by the same machine or a different machine as application server 130. In some embodiments, a network server 125 may be an actual device or a logical device that processes requests and forwards requests or generates new requests to application server 130 to be serviced and returned to client 110 or mobile device 115.

Application server 130 may communicate with network server 125, application servers 140 and 150, datastore 170, and may include one or more applications 142. Application server 140 may be implemented on the same machine or a different machine as network server 130.

Application server 130 may include one or more node.js applications. The node.js application may be written in Java script and run on a Windows, Apple operating system (OS), or a Linux OS. Application server 130 may also include monitoring components which identify application functions and trace application functions which execute as part of the execution flow in the node.js platform. More detail for application server 130 is discussed below with respect to the block diagram of FIG. 2.

Application servers 140 and 150 may communicate with each other, application server 130, data store 170, network server 125, and tracer 160. Each of application servers 140 and 150 may include one or more node.js applications and monitoring components similar to application server 130. Application servers 130-150 may process distributed business transactions that involve node.js applications on one or more of servers 130-150.

Tracer 160 may be used to trace application functions of node.js applications. Tracer application 160 may receive information from monitoring components installed on an application of application server 130, 140 and 150. Tracer 160 may receive event information and transaction identifiers from application monitoring components, stitch the information and transaction identifiers together to determine virtual threads and runtime data for each virtual thread (contextual information), and report that data to a user. The data may be reported in any of several typical reporting methods, including alerts, email messages, SMS messages, and via a web-based interface viewable by client device 180.

Data store 170 may receive requests from application servers 130-150, process the request, and transmit a response to the requesting server.

Figure 2:
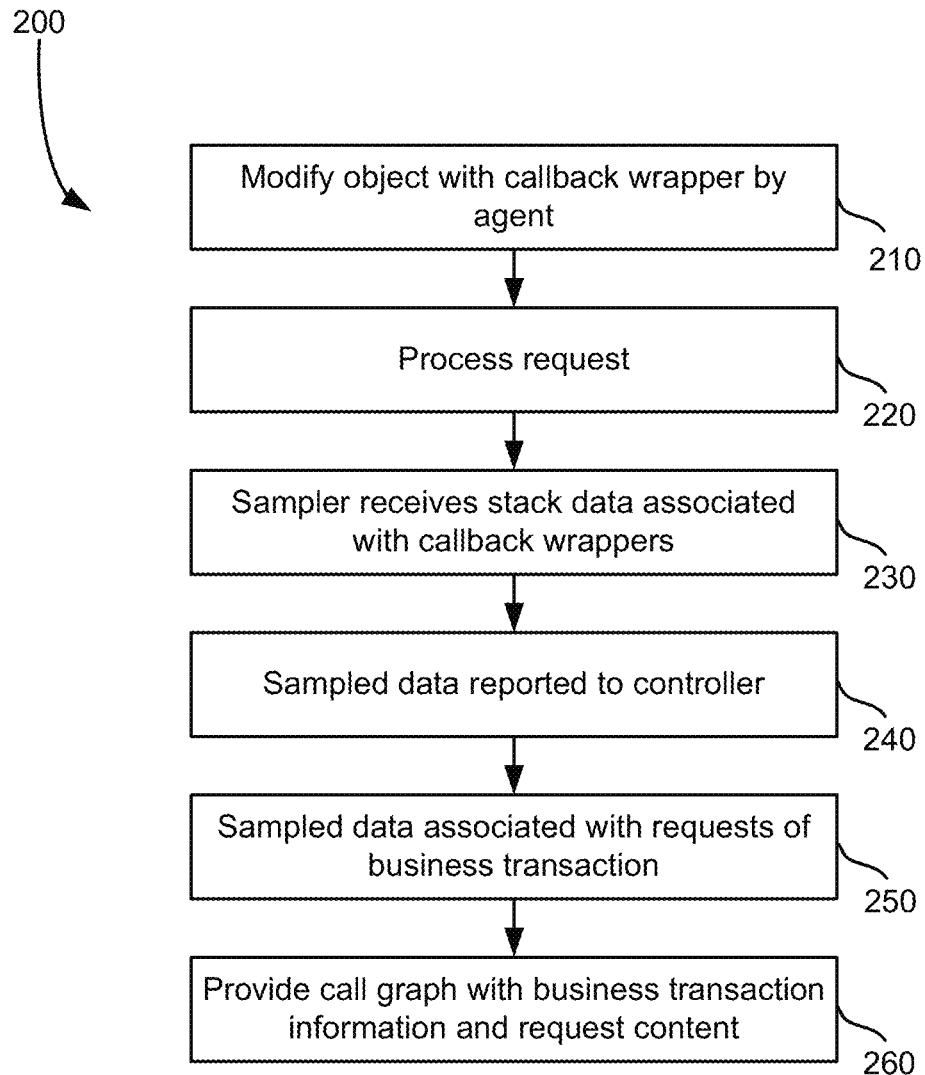
FIG. 2 is a method for monitoring a platform which executes one method at a time.

FIG. 2 is a method for monitoring a platform which executes a single thread at a time. First, an object may be modified with a callback wrapper by an agent at step 210. To modify the object, an agent installed in a local application may detect an object for a server and replace information within the detected object. More details for modifying an object with a callback wrapper by an agent are discussed below with respect to the method of FIG. 3. A request may then be processed at step 220. To process the request, the request is received with business transaction information, the business transaction information is stored and associated with a GUID, and the process is request by the framework. More details for processing a request are discussed with respect to the method of FIG. 4.

A sampler may retrieve stack data associated with a callback wrapper at step 230. The sampler may capture all data handled for the single thread. For example, with respect to a nodeJS platform, the sampler may be a V8 sampler. In this case, the sampler may be turned on and off, and will return all sampled data from a call stack upon being turned off. The sample data may be reported to a controller at step 240. The reported data may then be associated with requests of a particular business transaction at step 250.

When a request is received at step 220, the request may include a business transaction identifier. Hence, as soon as the request is received, the business transaction it is associated with is known. The agent that modifies an object with a callback wrapper may correlate the business transaction information to a unique identifier used to name the callback wrapper. The unique callback wrapper will show up in the sample data as it was the name provided to the call stack when that particular request is executing. The correlation between the business transaction and request to the unique identifier provided to the callback wrapper may be done locally at the agent or remotely at a controller.

A call graph may be provided with business transaction information and request information as context for individual request instances at step 260. Other requests may be reported as well, in addition to call graphs, such as for example lists of business application transactions, snapshots of application performance, and other reports.

Figure 3:
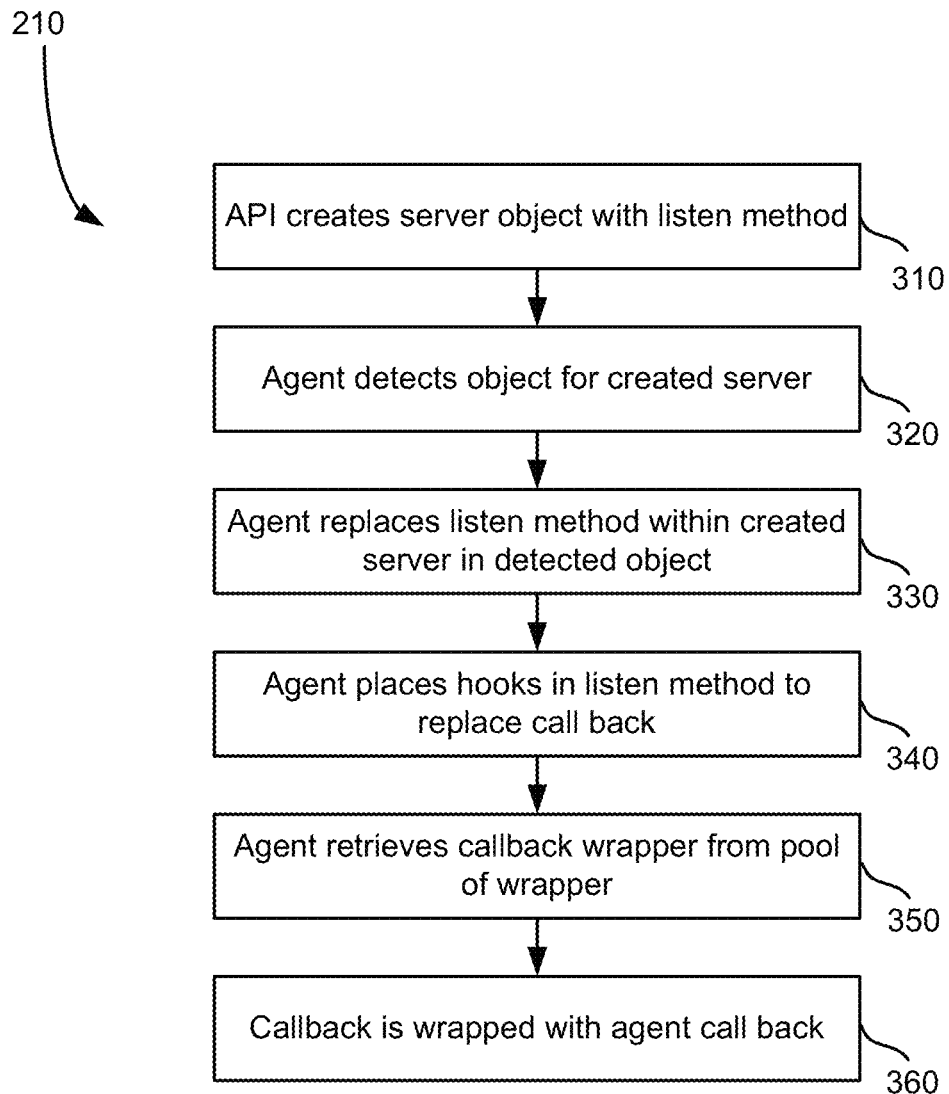
FIG. 3 illustrates a method for modifying an object with a callback wrapper.

FIG. 3 provides a method for modifying an object with a callback wrapper. The method of FIG. 3 may provide more detail for step 210 of the method of FIG. 2. First, an application program interface (API) may create a server object with a listen method at step 310. This may be a straightforward process for the particular platform. The agent installed on that machine may then detect the object created for the server at step 320. The object may be an http object or other type of object.

Once the object is created, an agent may replace the listen method within the created server in the detected object at step 330. The agent may then place hooks in the listen method to replace the callback at step 340. The agent may then retrieve a callback wrapper from a pool of wrappers at step 350. Each wrapper in the pool of wrappers may have a unique name. The callback object may be wrapped with a callback wrapper at step 360. As a result, a callback wrapper wraps the detected object and the detected object will have the unique name of the callback wrapper. Rather than executing request instances which have the same name, different instances of the same request but in different business transactions will have a name that is associated with a global unique identifier—the name of the callback wrapper retrieved from the pool of wrappers.

When the object is executed, the name associated with the callback wrapper will be placed on a call stack when the object is executed. The agent may correlate the retrieved callback wrapper retrieved from the pool of wrappers with the business transaction detected in the request and the particular request being executed. Therefore, when the agent later receives sampled call stack information, the agent may detect the unique callback wrapper name and associate it with a business transaction and corresponding request.

Figure 4:
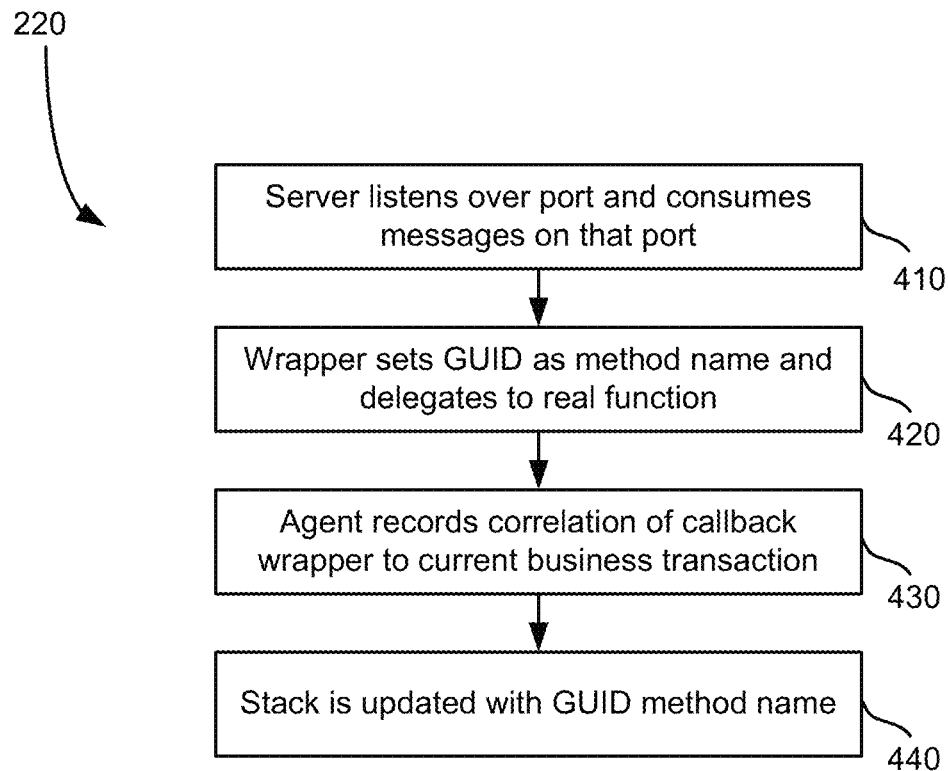
FIG. 4 is a method for processing a request.

FIG. 4 provides a method for processing a request. The method of FIG. 4 provides more detail for step 220 of the method of FIG. 2. First, a server may listen over a port and consume messages such as http messages that come in on that port on step 410. This is performed automatically when the API creates an http server with a listen method. A wrapper sets a GUID as the method name and delegates to the real function when an object is called at step 420. The agent may then record a correlation of a callback wrapper to the current business transaction at step 430. The stack may then be updated with the GUID method name at step 440.

Figure 5:
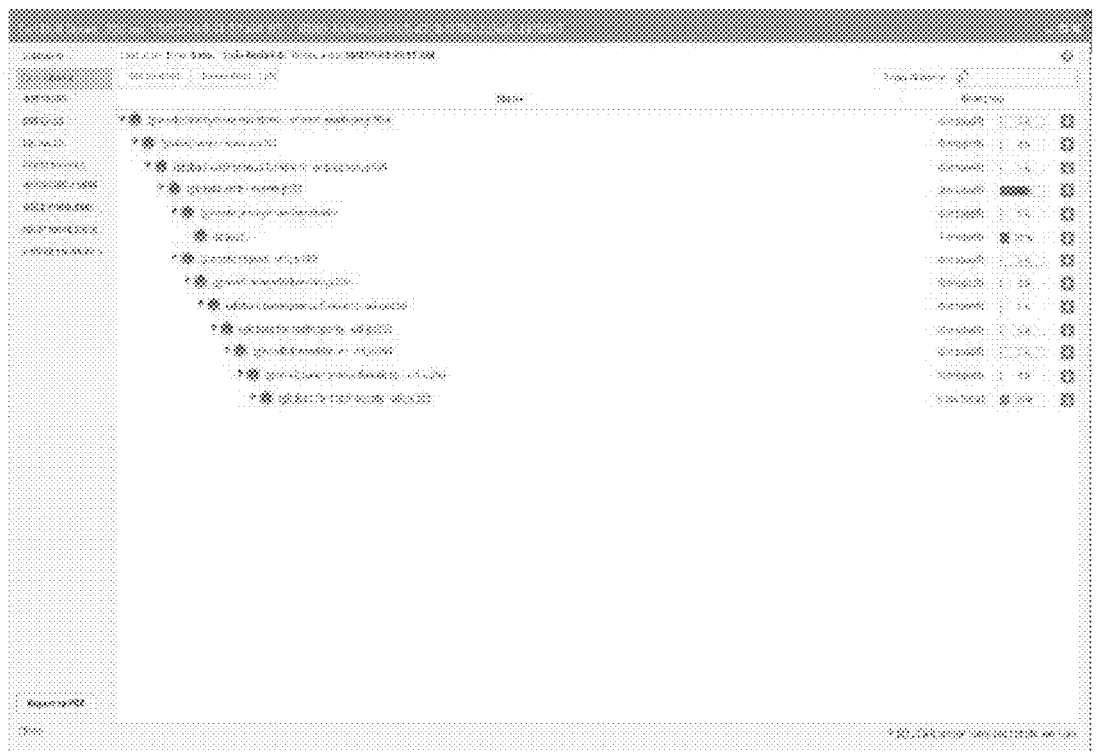
FIG. 5 includes an illustration of a call graph which includes business transaction and request context.

FIG. 5 includes an illustration of a call graph which includes business transaction and request context. The call graph differs identifies requests of a business transaction in a hierarchical call graph. The context would not be possible from sampling engines and systems of the prior art as there would be no context—a particular request would not be distinguished from other instances of the request in other business transactions, and the instances would collectively be considered a single instance. By naming the requests based on unique callback wrappers with a unique global ID, each request can be associated with a particular request instance within a business transaction.

Figure 6:
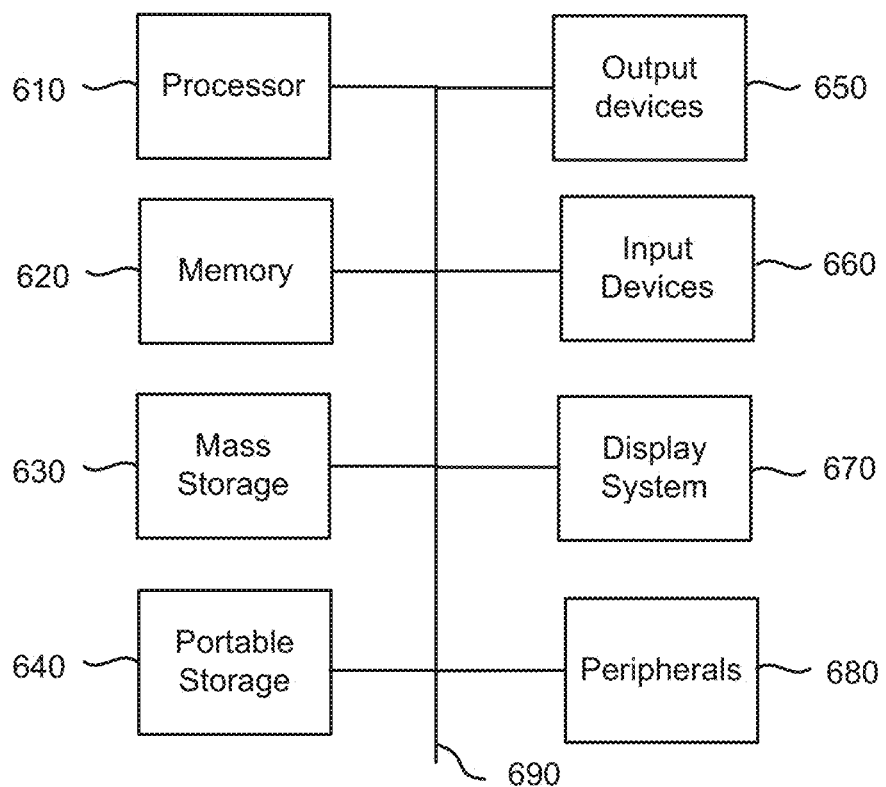
FIG. 6 is a block diagram of a computer environment for use with the present technology.

FIG. 6 is a block diagram of a computing environment for implementing the present technology. FIG. 6 is a block diagram of a computing environment for implementing the present technology. System 600 of FIG. 6 may be implemented in the contexts of the likes of clients 11- and 115, network server 125, application servers 130-150, tracer 160, data store 170, and client device 180. A system similar to that in FIG. 6 may be used to implement mobile device 115, but may include additional components such as an antenna, additional microphones, and other components typically found in mobile devices such as a smart phone or tablet computer.

The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include an LED, liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

When implementing a mobile device such as smart phone or tablet computer, the computer system 600 of FIG. 6 may include one or more antennas, radios, and other circuitry for communicating over wireless signals, such as for example communication using Wi-Fi, cellular, or other wireless signals.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring an application, comprising:
    modifying an object with a callback wrapper by agent stored in memory;
    receiving, by the agent, sampled call stack data associated with the callback wrapper by the agent, the sampled call stack data including a unique identification for each request in a business transaction; and
    reporting the sampled call stack data to a remote server, the remote server reporting data associated with each request instance of the business transaction based on the sampled call stack data.

2. The method of claim 1, wherein modifying the object includes placing the callback wrapper around the object that includes a callback object associated with a request.

3. The method of claim 2, wherein the callback wrapper includes a globally unique name, the unique identification including the unique name.

4. The method of claim 2, wherein the callback wrapper is retrieved from a pool of callback wrappers having unique names.

5. The method of claim 1, further comprising associating the unique identification with a business transaction request instance by the agent, the reported sampled call stack data including the associated business transaction request instance.

6. The method of claim 1, wherein the remote server reports a hierarchical call graph of the business transaction and requests called as part of the business transaction.

7. The method of claim 1, wherein modifying the object includes modifying a listen method within a create server created via an application program interface of a programming framework.

8. The method of claim 1, wherein the object is part of a platform built on Java script.

9. The method of claim 1, wherein the object is executed on a NodeJS platform.

10. The method of claim 1, further comprising: processing a request by modified object; and
    providing a call stack with the unique identification.

11. A non-transitory computer readable storage medium having embodied thereon a program, the program being executable by a processor to perform a method for monitoring an application, the method comprising:
    modifying an object with a callback wrapper by agent stored in memory;
    receiving, by the agent, sampled call stack data associated with the callback wrapper by the agent, the sampled call stack data including a unique identification for each request in a business transaction; and
    reporting the sampled call stack data to a remote server, the remote server reporting data associated with each request instance of the business transaction based on the sampled call stack data.

12. The non-transitory computer readable storage medium of claim 11, wherein modifying the object includes placing the callback wrapper around the object including:
    a callback object associated with a request.

13. The non-transitory computer readable storage medium of claim 12, wherein the callback wrapper includes a globally unique name, the unique identification including the unique name.

14. The non-transitory computer readable storage medium of claim 12, wherein the callback wrapper is retrieved from a pool of callback wrappers having unique names.

15. The non-transitory computer readable storage medium of claim 11, further comprising associating the unique identification with a business transaction request instance by the agent, the reported sampled call stack data including the associated business transaction request instance.

16. The non-transitory computer readable storage medium of claim 11, wherein the remote server reports a hierarchical call graph of the business transaction and requests called as part of the business transaction.

17. The non-transitory computer readable storage medium of claim 11, wherein modifying the object includes modifying a listen method within a create server created via an application program interface of a programming framework.

18. The non-transitory computer readable storage medium of claim 11, wherein the object is part of a platform built on Java script.

19. The non-transitory computer readable storage medium of claim 11, wherein the object is executed on a NodeJS platform.

20. The non-transitory computer readable storage medium of claim 11, further comprising:
    processing a request by modified object; and
    providing a call stack with the unique identification.

21. A system for monitoring an application, comprising: a processor;
    a memory; and
    one or more modules stored in memory and executable by a processor to modify an object with a callback wrapper by an agent stored in memory, receive, by the agent, sampled call stack data associated with the callback wrapper by the agent, the sampled call stack data including a unique identification for each request in a business transaction, and report the sampled call stack data to a remote server, the remote server reporting data associated with each request instance of PA the business transaction based on the sampled call stack data.

22. The system of claim 21, wherein the one or more modules are further executable to place the callback wrapper around the object that includes a callback object associated with a request.

23. The system of claim 22, wherein the callback wrapper includes a globally unique name, the unique identification including the unique name.

24. The system of claim 22, wherein the callback wrapper is retrieved from a pool of callback wrappers having unique names.

25. The system of claim 21, wherein the one or more modules are further executable to associate the unique identification with a business transaction request instance by the agent, the reported sampled call stack data including the associated business transaction request instance.

26. The system of claim 21, wherein the remote server reports a hierarchical call graph of the business transaction and requests called as part of the business transaction.

27. The system of claim 21, wherein the one or more modules are further executable to modify a listen method within a create server created via an application program interface of a programming framework.

28. The system of claim 21, wherein the object is part of a platform built on Java script.

29. The system of claim 21, wherein the object is executed on a NodeJS platform.

30. The system of claim 21, wherein the one or more modules are further executable to process a request by modified object and provide a call stack with the unique identification.

* * * * *